United States Patent [19]
Olds

[11] Patent Number: 5,878,415
[45] Date of Patent: Mar. 2, 1999

[54] CONTROLLING ACCESS TO OBJECTS IN A HIERARCHICAL DATABASE

[75] Inventor: Dale R. Olds, Sandy, Utah

[73] Assignee: Novell, Inc., Provo, Utah

[21] Appl. No.: 821,087

[22] Filed: Mar. 20, 1997

[51] Int. Cl.⁶ .................................................. G06F 17/30
[52] U.S. Cl. ................... 707/9; 707/10; 707/100; 707/103; 711/100; 711/154; 711/163; 395/200.59
[58] Field of Search ............................ 707/103, 10, 100; 364/282.1, 283.3, 286.4, 286.5; 380/25, 23; 395/200.59; 711/100, 154, 163

[56] References Cited

U.S. PATENT DOCUMENTS

| 5,202,981 | 4/1993 | Shackelford | 707/1 |
|---|---|---|---|
| 5,241,624 | 8/1993 | Torres | 345/429 |
| 5,261,102 | 11/1993 | Hoffman | 395/186 |
| 5,335,346 | 8/1994 | Fabbio | 711/163 |
| 5,432,934 | 7/1995 | Levin et al. | 395/650 |
| 5,437,025 | 7/1995 | Bale et al. | 707/103 |
| 5,504,892 | 4/1996 | Bryan et al. | 707/103 |
| 5,608,903 | 3/1997 | Prasad et al. | 395/610 |
| 5,664,170 | 9/1997 | Taylor | 395/200.5 |
| 5,675,782 | 10/1997 | David et al. | 707/9 |
| 5,677,851 | 10/1997 | Kingdon et al. | 395/200.59 |
| 5,701,458 | 12/1997 | Bsaibes | 707/9 |
| 5,758,153 | 5/1998 | Bryan et al. | 707/103 |
| 5,758,344 | 5/1998 | Prasad et al. | 707/10 |
| 5,784,560 | 7/1998 | Kingdon et al. | 395/200.31 |

OTHER PUBLICATIONS

Werner Fiebel, Novell's® Complete Encyclopedia of Networking, (1995), pp. 12, 13, 239–241, 317, 488, 625–630.
Andrew S. Tannebaum, Distributed Operating Systems, (1995), pp. 520–527, 544–563.
Doug Bierer et al., NetWare 4 for Professionals, (1993), pp. 389–406, 470–475, 755–764, 770–793.

*Primary Examiner*—Paul V. Kulik
*Assistant Examiner*—Jean M. Corrielus
*Attorney, Agent, or Firm*—Computer Law++

[57] ABSTRACT

Methods and systems are provided for controlling access to objects in a hierarchical database. The database may include a directory services repository, and/or synchronized partitions. An access constraint propagator reads an access control property of an ancestor of a target object. The access control property designates an inheritable access constraint such as an object class filter or an "inheritable" flag. The object class filter restricts a grant of rights to objects of an identified class. The "inheritable" flag allows inheritance of an access constraint on a specific object property. The propagator enforces the inheritable access constraint by applying it to at least the target object.

24 Claims, 5 Drawing Sheets

CONTROLLING ACCESS TO OBJECTS IN A HIERARCHICAL DATABASE

FIELD OF THE INVENTION

The present invention relates to systems and methods for controlling access to objects in a hierarchical database such as a directory service repository. More particularly, the invention relates to uses of two features—inheritance and subtree filtering—to control access to objects in the hierarchical database.

TECHNICAL BACKGROUND OF THE INVENTION

Hierarchical database structures are increasingly important, because they help organize information in computer systems. In particular, hierarchical databases are used in large and complex computer networks by directory service providers. Directory services are sometimes called "naming services." Directory service hierarchical databases are also known as "directory service databases" or "directory service repositories".

A variety of directory service providers are now available to help administer both the location of network resources and the rights of network users to use those resources. Many, but not all, directory service tools conform at least in part with the X.500 directory services standard. One well-known directory service system includes NetWare Directory Services software commercially available from Novell, Inc. of Orem, Utah (NETWARE DIRECTORY SERVICES is a trademark of Novell, Inc.). As used herein, "Novell Directory Services" ("NDS") includes NetWare Directory Services and any other directory service commercially available from Novell, Inc.

A hierarchical database differs in several important ways from a relational database. Directory service repositories and other hierarchical databases are organized hierarchically, as one or more trees. Each object in a tree (except the root object) has exactly one parent. Objects may generally have children, which may inherit properties from their ancestor objects. Objects are instances of "classes," as described in detail below.

By contrast, each relational database is organized as a set of tables in which rows represent records and columns represent record fields. Certain fields may be found in multiple tables, and the values of these "key" or "index" fields are used to guide database searches. Database access and manipulation involve combining information from various tables into new combinations to obtain different views of the data.

The structure of at least one NDS directory services provider is defined by a schema. The schema includes a set of "attribute syntax" definitions, a set of "attribute" definitions, and a set of "object class" definitions. The NDS software and a default NDS schema are described in Bierer et al., *NetWare 4 for Professionals*, ISBN 1-56205-217-9 ("NetWare 4"), pages 255–342. The terms "attribute" and "property" are used interchangeably in NetWare 4 and herein, as are the terms "attribute syntax" and "property syntax."

Each attribute syntax in the schema is specified by an attribute syntax name and the kind and/or range of values that can be assigned to attributes of the given attribute syntax type. Attribute syntaxes include, without limitation, Case Exact String (case-sensitive string), Case Ignore List (case-insensitive string list), E-Mail Address, Net Address (valid addresses include IPX and AppleTalk), Path, and Stream. Attribute syntaxes correspond roughly to data types such as integer, float, string, file, stream, or Boolean, or to collections of these types, in conventional programming languages.

Each attribute in the schema has certain information associated with it. Each attribute has an attribute name and an attribute syntax type. The attribute name identifies the attribute, while the attribute syntax limits the values that are assumed by the attribute. For instance, the default NDS schema includes an attribute of syntax type integer having the name "supported connections" which specifies the number of concurrent connections a file server allows.

Each attribute may also have associated with it any or all of the following flags: Non-removable, Hidden, Public Read, Read Only, Single-Valued, Sized, and String. The general meanings of these flags are familiar to those of skill in the art. If the Sized flag is set for a given attribute, then upper and lower bounds (possibly including No Limit) are imposed on values to be held by that attribute.

Each object class in the schema also has certain information associated with it. Each object class has a class name which identifies it, a set of super classes that identifies the other classes from which this class inherits attributes, and a set of containment classes that identifies the classes permitted to contain instances of this class.

Each object class also has a container flag and an effective flag. The container flag indicates whether the class is a container class, that is, whether it is capable of containing instances of other object classes. The effective flag indicates whether instances of the class (objects) can be defined. Non-effective object classes are used only to define attributes that will be inherited by other classes, whereas effective classes are used to define inheritable attributes, to define instances, or to define both.

In addition, each object class groups together certain attributes. The naming attributes of an object class are those attributes that can be used to name objects belonging to the class. The mandatory attributes of an object class are those attributes that must exist in each valid instance of the class and/or become mandatory attributes of classes which inherit from the class. The optional attributes of an object class are those attributes that may, but need not, exist in each valid instance of the class. Optional attributes of a parent class become optional attributes of a child class which inherits from the parent class, unless the attributes are mandatory in some other parent class from which the child inherits, in which case they are also mandatory in the child.

A database object is an instance of an object class. Different objects of the same class have the same mandatory attributes but may have different current values in their corresponding mandatory attributes. Different objects of the same class may have different optional attributes, and/or different current values in their corresponding optional attributes.

The hierarchical database may also be a "synchronized-partition" database. Such a database is typically divided into two or more non-overlapping partitions. To improve the response time to database queries and to provide fault-tolerance, a replica of each partition is physically stored on one or more file servers in the network. The replicas of a given partition are regularly updated by the directory services provider through an automated synchronization process, thereby reducing the differences between replicas caused by activity on the network.

In addition to organizing information by grouping objects into classes and subtrees, hierarchical databases can be used to control access to information and other resources. For instance, commercially available NDS software provides at least three means for controlling access: access control lists, inherited rights filters, and security equivalence. These access control tools are discussed at pages 389–401 of NetWare 4 and elsewhere. For convenience, however, aspects of these access control methods are repeated here.

An access control list is an optional property of every object class. Multiple access control lists may exist on a single object, and there is no limit (other than space and efficiency considerations) on the number of access control lists per object. The access control lists of an object identify trustees who are given rights to access properties of that object.

Each access control property has three parts. The first part identifies a trustee object which receives access rights. The second part identifies a property type, thereby indicating the property or properties for which those access rights are given. Property types include "object rights," "all properties rights," and specific properties.

The third part of the access control property identifies at least one access right that is given to the trustee object for properties of the indicated property type. For "object rights," possible access rights include rights to browse, create, delete, rename, or supervise. For "all properties rights," possible access rights include rights to compare, read, write, add, delete, or supervise.

Rights granted to "object rights" or by "all properties rights" by an access control property are inherited. For instance, rights granted at a container apply downward from the container, to all objects in the subtree of which the container is the root. Rights granted to a specific property are not inherited, but rights limited to a specific property of a group of objects may be granted by placing an appropriate access control property on each object in the group, or by placing an appropriate security equivalence property on each of those objects.

Security equivalence is implemented by using an optional Security Equals property. This property contains the names of other objects in the tree. The object having the Security Equals property then derives access rights from the other objects named in the Security Equals property. More precisely, each object is security equivalent to "public," to "root," to every object in its distinguished name, and to every object in its Security Equals property, in that order.

The inheritance of rights may be filtered. This capability is sometimes call "rights masking." An inherited rights filter determines which rights can be inherited in the object hierarchy from a given point downward. Rights masking is implemented in NDS in the same structure as an access control list, with a filter taking the place of the trustee name. Thus, the inherited rights filter can designate object properties, all properties, or a specific property. The filter does not grant rights. Instead, it places limits on which rights can be granted.

It is often desirable to grant rights suitable for administration of particular resources. For instance, a printer administrator would need rights to add, delete, and modify printer objects in a subtree. A telephone number administrator would need rights to modify telephone numbers on user objects. A password administrator would need rights to change a user's password when the user forgets the original password. And a personnel administrator would need rights to create, modify, delete, and move user objects to reflect personnel changes. Moreover, it is desirable to grant these specialized administration rights in a way that is compatible with existing access control mechanisms, so that the database is not taken out of service during a long and painful conversion process.

One conventional approach is to give each of these specialized administrators supervisor rights to the appropriate subtree(s). Unfortunately, this gives the specialized administrators more rights than are strictly necessary. Granting excess rights may lead at best to inconsistent attempts to change the database, as when one administrator updates a phone number and another later inadvertently loses the update by restoring data from an old backup. At worst, granting excess rights may lead to a security breach which compromises the secrecy and/or integrity of information in the database.

Another approach is to place an appropriate access control property on each administered object. However, rather than easing administration, this creates significant maintenance burdens. The number of objects involved is often large, and updating the access control properties in a large subtree can be time-consuming, tedious, and error-prone.

Thus, it would be an advancement in the art to provide a system and method for efficiently granting limited rights to specialized administrators in a hierarchical database.

It would be an additional advancement to provide such a system and method which are extensions of the capabilities of existing access control mechanisms, and hence can be used in conjunction with existing mechanisms.

Such a method and system are disclosed and claimed herein.

BRIEF SUMMARY OF THE INVENTION

The present invention provides methods and systems for controlling access to objects in a hierarchical database. In one embodiment, a computer-implemented method begins by choosing at least one target object in the hierarchical database and then selecting an ancestor object which is a hierarchical ancestor of the target object. An access constraint propagator reads an access control value previously inserted in an access control property of the ancestor object. The access control property designates an inheritable access constraint such as an object class filter or an "inheritable" flag. The object class filter restricts a grant of rights to objects of an identified class. The "inheritable" flag allows inheritance of an access constraint on a specific property. The propagator enforces the inheritable access constraint by applying it to at least the target object.

The access control property of the ancestor object identifies a trustee object which receives access rights, identifies a property type indicating the property or properties for which those access rights are given, and identifies at least one access right that is given to the trustee object for properties of that property type.

In one embodiment, the access control property of the ancestor object also identifies an object class, and the propagator gives the trustee object the identified access right for a target object property of the identified property type only if the target object belongs to the identified object class. For instance, a printer administrator may be given supervisor rights only with respect to printer objects.

In another embodiment, the property type identified in the access control property of the ancestor object indicates a specific object property rather than a set of properties, and the propagator gives the trustee object the identified access right for the specific property of the target object. If the "inheritable" flag is set, then the rights are also granted to the specified property in each descendant of the target object. For instance, the "inheritable" flag can be used to give a trustee object the right to write to the phone number attribute on a target object and to the phone number attribute on all descendants of that target object. Previously, the telephone administrator had to receive either all supervisory rights or explicit individual rights for each object.

A hierarchical database access control system according to the invention includes a computer system having a storage medium and a processor. A hierarchical database stored in the storage medium is susceptible to processing with the processor. The database may include a directory services repository, and/or synchronized partitions. The database includes a target object and an ancestor object. The ancestor object has an access control property (similar or identical to that described above) which designates an inheritable access constraint such as an object class filter and/or an access constraint on a specific object property.

The system also includes means for propagating the inheritable access constraint by applying it to at least the target object. The means for propagating may include an inherited rights filter for masking access rights. If the access control property of the ancestor object also identifies an object class, then the means for propagating includes means for giving the trustee object the identified access right for a target object property only if the target object belongs to the identified object class. If the property type identified in the access control property of the ancestor object indicates a specific object property rather than a set of properties, then the means for propagating includes giving the trustee object the identified access right for the specific property of the target object.

Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention relates to a method and system for controlling access to information objects in a hierarchical database that is stored on, or accessible through, a computer network or other computer system. Information objects include, without limitation: directory service database components, other hierarchical database components, and Novell Directory Service components such as containers, leaves, objects, and attributes.

Computer networks which may be configured according to the invention include local networks, wide area networks, and/or the Internet. "Internet" as used herein includes variations such as a private Internet, a secure Internet, a value-added network, a virtual private network, or an intranet. The computers connected by the network may be workstations, laptop computers, disconnectable mobile computers, file servers, or a combination thereof. The network may include one or more LANs, wide-area networks, Internet servers and clients, intranet servers and clients, or a combination thereof.

Figure 1:
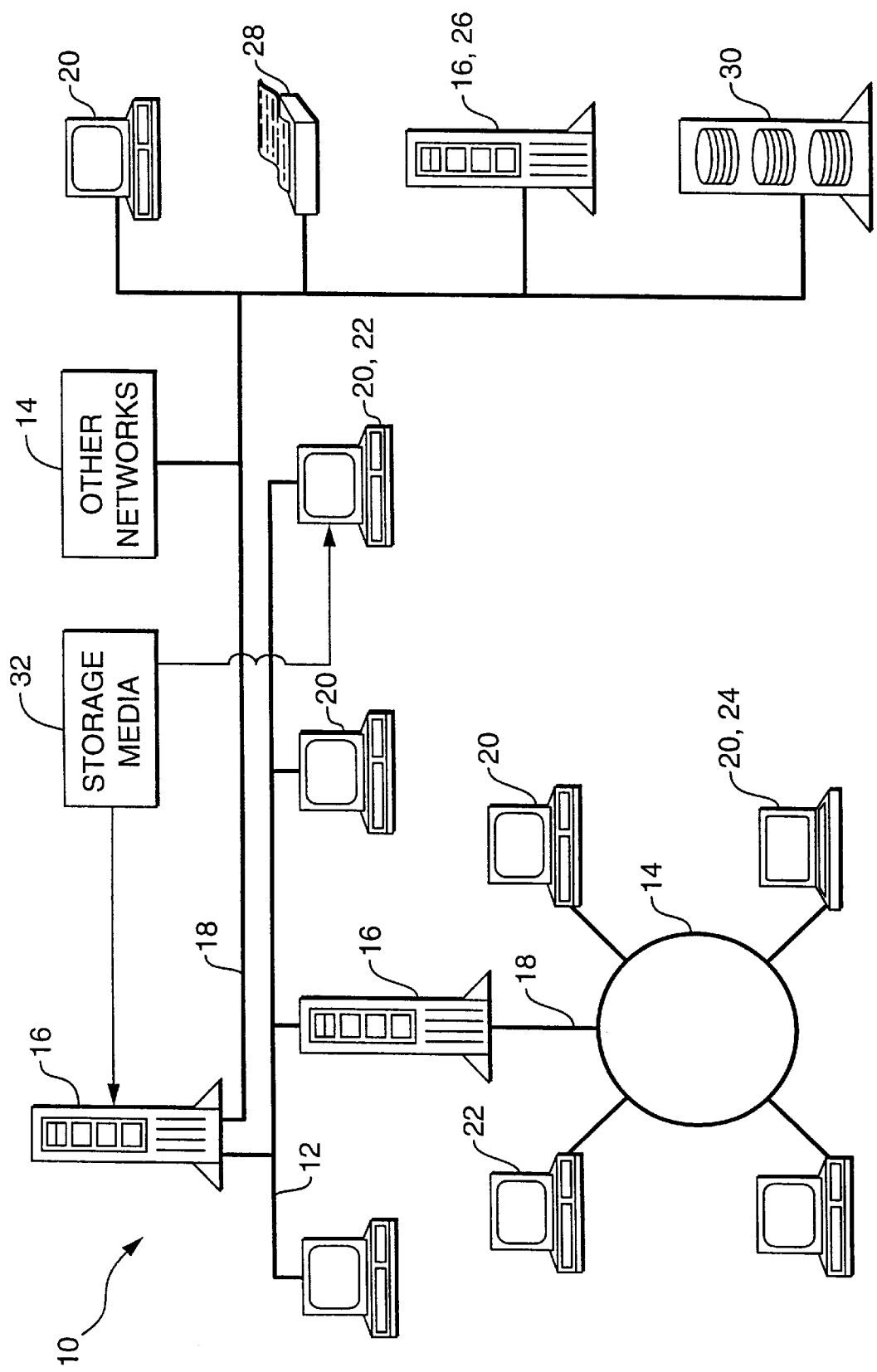
FIG. 1 is a diagram illustrating a computer networked hierarchical database system which is one of many systems suitable for use with the present invention.

One of the many computer networked hierarchical database systems suited for use with the present invention is indicated generally at 10 in FIG. 1. In one embodiment, the system 10 includes Novell NetWare® network operating system software (NETWARE is a registered trademark of Novell, Inc.). In alternative embodiments, the system 10 includes NetWare Connect Services, VINES, Windows NT, Windows 95, LAN Manager, or LANtastic network operating system software and/or an implementation of a distributed hierarchical partitioned object database according to the X.500 protocol (VINES is a trademark of Banyan Systems; NT, WINDOWS 95, and LAN MANAGER are trademarks of Microsoft Corporation; LANTASTIC is a trademark of Artisoft). The system 10 may include a local area network 12 which is connectable to other networks 14, including other LANs or portions of the Internet or an intranet, through a gateway or similar mechanism.

The system 10 includes several file servers 16 that are connected by network signal lines 18 to one or more network clients 20. The file servers 16 and network clients 20 may be configured by those of skill in the art in a wide variety of ways to operate according to the present invention. The file servers 16 may be configured as Internet servers, as intranet servers, as directory service providers or name servers, as software component servers, or as a combination thereof. The servers 16 may be uniprocessor or multiprocessor machines. The servers 16 and clients 20 each include an addressable storage medium such as random access memory and/or a non-volatile storage medium such as a magnetic or optical disk.

Suitable network clients 20 include, without limitation, personal computers 22, laptops 24, workstations 26, and dumb terminals. The signal lines 18 may include twisted pair, coaxial, or optical fiber cables, telephone lines, satellites, microwave relays, modulated AC power lines, and other data transmission "wires" known to those of skill in the art. In addition to the network client computers 20, a printer 28 and an array of disks 30 are also attached to the system 10. A given computer may function both as a client 20 and as a server 16; this may occur, for instance, on computers running Microsoft Windows NT software. Although particular individual and network computer systems and components are shown, those of skill in the art will appreciate that the present invention also works with a variety of other networks and computers.

The file servers 16 and the network clients 20 are capable of using floppy drives, tape drives, optical drives or other means to read a storage medium 32. A suitable storage medium 32 includes a magnetic, optical, or other computer-readable storage device having a specific physical substrate configuration. Suitable storage devices include floppy disks, hard disks, tape, CD-ROMs, PROMs, RAM, and other computer system storage devices. The substrate configuration represents data and instructions which cause the computer system to operate in a specific and predefined manner as described herein. Thus, the medium 32 tangibly embodies a program, functions, and/or instructions that are executable by the file servers 16 and/or network client computers 20 to perform information object access control steps of the present invention substantially as described herein.

Figure 2:
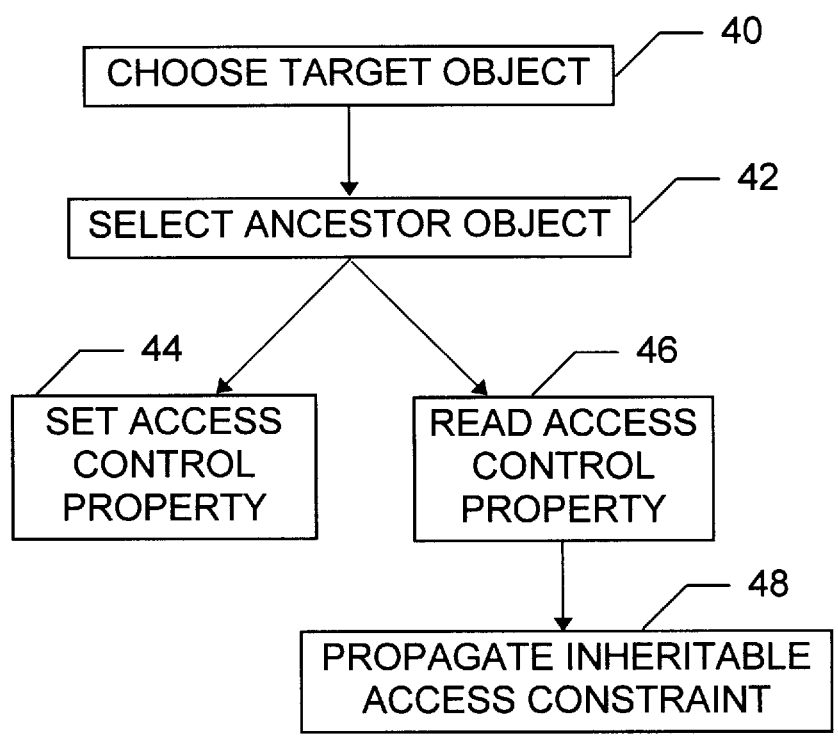
FIG. 2 is a flowchart illustrating a method for controlling hierarchical database access according to the present invention.

FIG. 2 illustrates a general method of the present invention for controlling access to objects in a hierarchical database. Detailed examples based on the general method are discussed in connection with FIGS. 3 through 5. During a choosing step 40 shown in FIG. 2, at least one target object in the hierarchical database is chosen. Because the advantages of the present invention are magnified when access to an entire subtree of objects is controlled, the choosing step 40 may effectively result in many objects being chosen. The target object is typically chosen by a network administrator, security manager, or similar person. The basis for choosing the target object varies, but will often involve a desire to grant a trustee access rights to the target object or to a subtree of which the target object is the root.

During a selecting step 42, an ancestor object is selected. The ancestor object is a hierarchical ancestor of the target object. In those cases where the target choosing step 40 chooses several objects in a subtree, the ancestor object is typically either the root of the subtree or a near ancestor of that root object.

During a setting step 44, an access control property of the ancestor object is initially created and initialized, or (if the access control property was previously created) updated. In either case, an access control value is inserted in the access control property. The access control property designates an inheritable access constraint, such as an object class filter or a specific property access control, as discussed in detail hereafter.

During a reading step 46, one or more access control values stored in an access control property of the ancestor object are read. The values are then used during a propagating step 48, which propagates the inheritable access constraint by applying it to at least the target object. If the ancestor object is a subtree root or a subtree root ancestor, and inheritance is not prevented by masking, then the inheritable access constraint is applied to the entire subtree, including the target object and other objects in the subtree.

Figure 3:
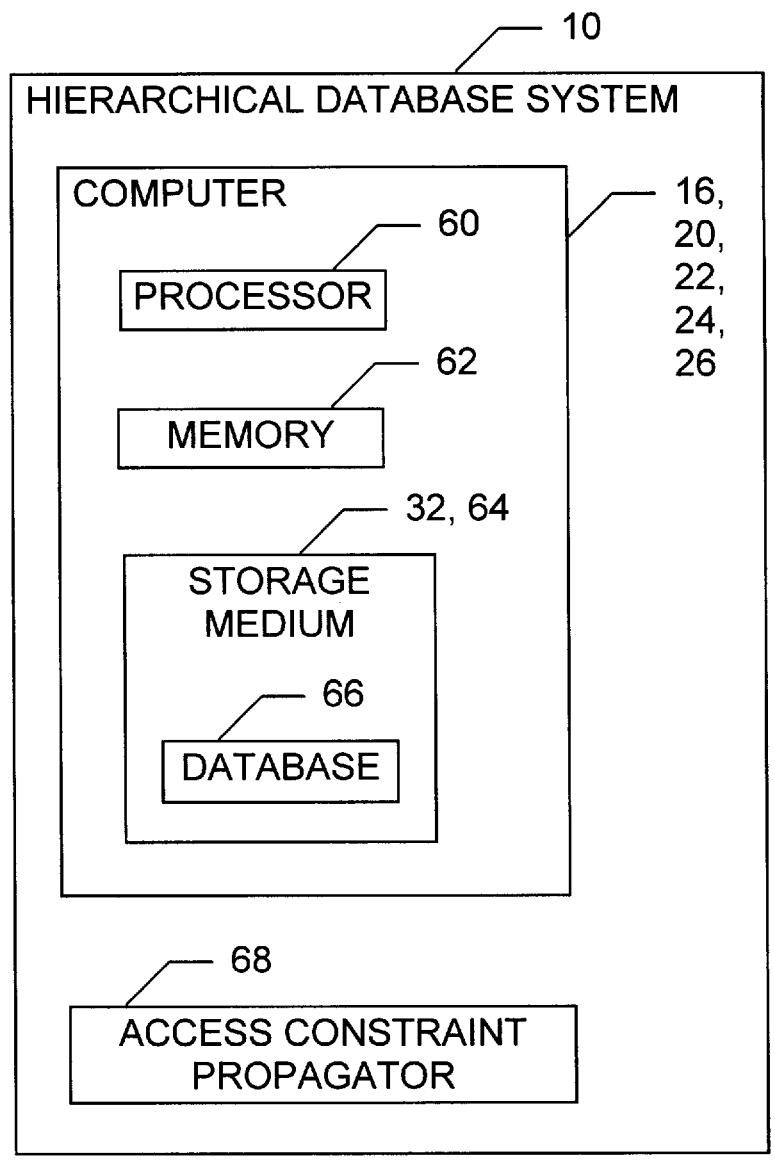
FIG. 3 is a diagram further illustrating the hierarchical database system shown in FIG. 1.

The general method illustrated in FIG. 2 can be applied to a variety of systems 10, including the particular system 10 which is illustrated further in FIG. 3. The system 10 includes a computer which may be any of the various computers identified above (servers 16, clients 20, personal computers 22, laptops 24, workstations 26) or another type of computer.

The computer includes a processor 60, such as one or more microprocessors, and a memory 62, such as static and/or dynamic random access memory. The computer also includes a storage medium which may be the same storage medium 32 (FIG. 1) that embodies software to perform information object access control steps of the present invention, or it may be another storage medium 64, such as another disk or the disk array 30 (FIG. 1).

A hierarchical database 66 is stored on the storage medium. The database 66 may be a directory services repository or another hierarchical database, but is not a conventional relational database. The database 66 may include elements of NDS databases described above. The database 66 is discussed further below in connection with FIG. 4.

In addition to the computer, the hierarchical database system 10 shown in FIG. 3 includes an access constraint propagator 68. The propagator 68 may include conventional hierarchical database access means, such as conventional directory services or NDS software, which has been extended according to the present invention to propagate previously unavailable inheritable access constraints such as object class filters and/or specific property access controls.

Figure 4:
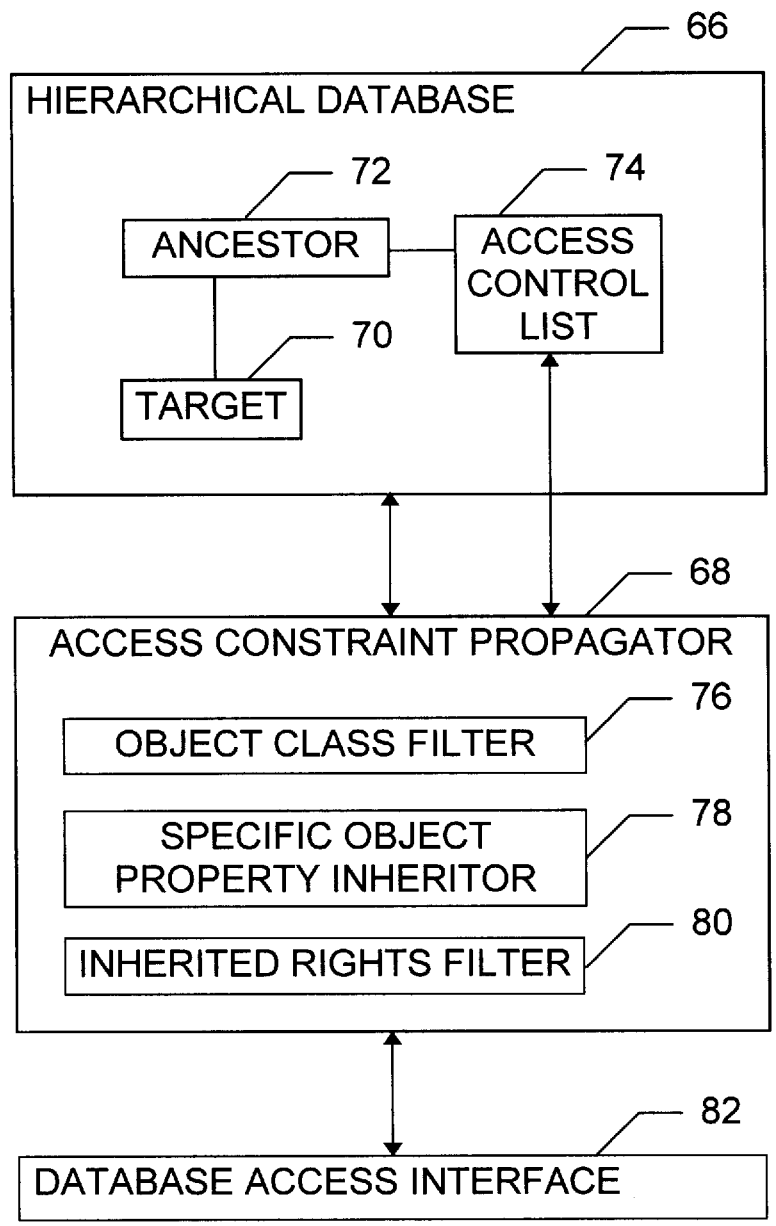
FIG. 4 is a diagram further illustrating database and access constraint propagation components of the system shown in FIG. 3.

The hierarchical database 66 and the access constraint propagator 68 are further illustrated in FIG. 4. As suggested by the method steps shown in FIG. 2, the hierarchical database 66 includes a target object 70, and an ancestor object 72 which is an ancestor of the target object 70. The target object 70 is an instance of an object class, such as a class defining users, printers, or other information resources. The ancestor object 72 is typically, but not necessarily, an instance of a container object class.

An access control list 74 is associated (by pointers or other conventional means) with the ancestor object 72. The access control list contains one or more access control properties 84 (FIG. 5), whose structure and contents correspond to and guide access constraints applied by the access constraint propagator 68.

The propagator 68 includes an object class filter 76, a specific property inheritor 78, and/or another novel inheritable access constraint. The propagator 68 optionally also includes conventional access constraints such as inherited rights filters 80. The object class filter 76, specific property inheritor 78, and other novel inheritable access constraints are preferably implemented as software running on the computer shown in FIGS. 1 and 3, and they are preferably integrated with conventional access constraints such as inherited rights filters 80, security equivalence constraints, "object rights" inheritors, and "all properties rights" inheritors.

Figure 5:
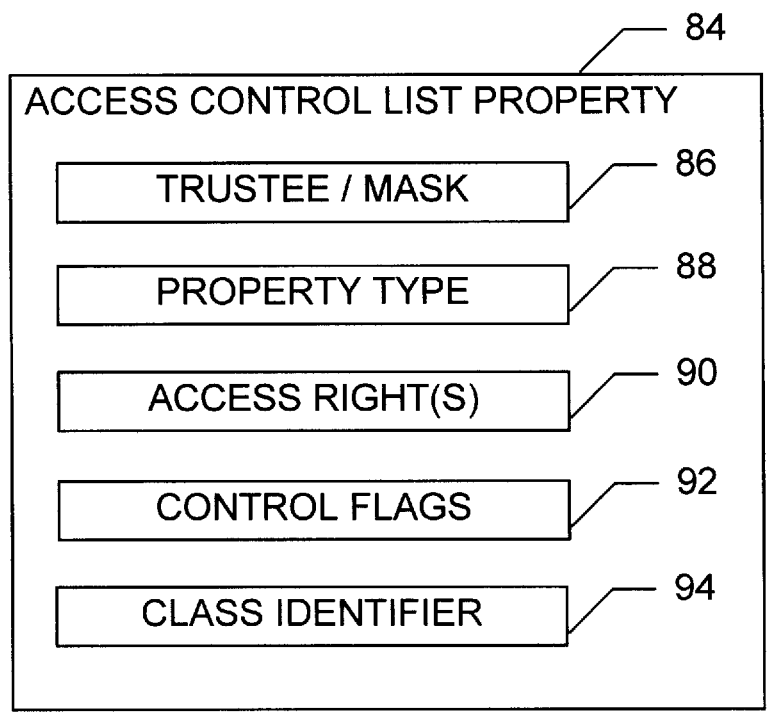
FIG. 5 is a diagram illustrating possible access control list property components according to the invention.

FIG. 5 illustrates access control values 86 through 94 in an access control property 84 in the access control list 74 (FIG. 4). A trustee/mask field 86 contains a value identifying a trustee if the property 84 indicates in a property type field 88 that the property 84 grants "object rights" or "all properties rights" or a specific property access right. The trustee/mask field 86 contains an access rights mask value if the property 84 masks inherited rights rather than granting rights. An access right(s) field 90 identifies the rights being granted or masked; possibilities include, without limitation, rights currently granted or masked by conventional access control properties.

Conventional access control list properties contain a similar trustee/mask field, property type field, and access right(s) field. However, conventional properties (and conventional access constraint propagators) do not provide for inheritance of specific property access rights.

Conventional properties also lack a control flags field 92 and a class identifier (object class filter) field 94. In one embodiment, the control flags field 92 includes an "inheritable" flag which indicates whether or not this access control list property 84 can be inherited by the descendants of target object 70 (FIG. 4). In one embodiment, the class identifier field 94 is either NULL or else it identifies an object class which is used to limit the class instances to which the propagator 68 (FIG. 4) applies the property 84.

In operation, and with reference to FIGS. 4 and 5, a database access interface 82, such as an NWAdmin tool or an NDS API, receives database access requests and communicates them to the access constraint propagator 68. The propagator 68 grants or denies access to the target object 70 and its descendants based whether rights are granted by the access control list 74 (or some other access control) and on whether those rights are inherited after application of the propagated constraints.

For instance, if the class identifier 94 identifies a printer object class, then the object class filter 76 in the access constraint propagator 68 only grants the trustee 86 rights 90 to properties 88 of target objects 70 or target object descendants (if inheritance applies) which are instances of the printer class. If zero, NULL, an "illegal" value, a flag, or some other means is used to indicate an empty class identifier 94, then the trustee 86 receives rights 90 to properties 88 of all target objects 70 regardless of their class, but subject to any other constraints that may be present.

As another example, the control flags 92 may contain an "inheritable" flag. If the flag is set, then the access constraint propagator 68 grants the trustee 86 the rights 90 to the property or properties 88 of the target 70 and all descendants of the target 70. If the flag is not set, then only rights 90 to the property or properties 88 of the target 70 are given. The flag may thus be used to grant (or stop) inheritance of object rights, so the trustee 86 receives rights to properties of a container object and also (or not) rights to the descendants of the container.

For instance, the "inheritable" flag can be used to give a trustee object the right to write to the phone number attribute on a target object and to the phone number attribute on all descendants of that target object. Previously, this was not possible because specific attribute rights did not inherit. To give a specialized phone number administrator rights to modify telephone attributes, the administrator had to receive either all supervisory rights or explicit individual rights for each object. Granting all rights opened the door to confusion or abuse, and granting individual rights to the objects one-by-one created severe maintenance burdens when objects were added or moved.

In summary, the present invention provides a novel system and method for controlling access to objects in a hierarchical database. Specific property access rights can now be inherited, as well as "object rights" and "all properties rights." Specialized administrators, such as printer administrators or phone number administrators, can be granted precisely the rights they need, without requiring explicit right grants one object at a time. Rights to an entire subtree can be granted through inheritance. Moreover, these capabilities are compatible extensions of existing systems, in that they can be used with inherited rights filters and other conventional means for controlling access rights.

Although particular methods embodying the present invention are expressly illustrated and described herein, it will be appreciated that apparatus and article embodiments may be formed according to methods of the present invention. Unless otherwise expressly indicated, the description herein of methods of the present invention therefore extends to corresponding apparatus and articles, and the description of apparatus and articles of the present invention extends likewise to corresponding methods.

All descriptions identified herein by citing specific topics or pages in NetWare 4 are incorporated herein by reference. In the event of a conflict, descriptions provided directly herein take precedence over those incorporated by reference.

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for controlling access to objects in a hierarchical database, the computer-implemented method comprising the steps of:

choosing at least one target object in the hierarchical database;

selecting an ancestor object which is a hierarchical ancestor of the target object;

reading an access control value in an access control property of the ancestor object, the access control property designating an inheritable access constraint; and propagating the inheritable access constraint by applying it to at least the target object.

2. The method of claim 1, further comprising the step of inserting the access control value in the access control property of the ancestor object.

3. The method of claim 1, wherein the inheritable access constraint provides an object class filter.

4. The method of claim 1, wherein the inheritable access constraint provides inheritance of an access constraint on a specific object property.

5. The method of claim 1, wherein the access control property of the ancestor object: (a) identifies a trustee object which receives access rights, (b) identifies a property type indicating the property or properties for which those access rights are given, and (c) identifies at least one access right that is given to the trustee object for properties of that property type.

6. The method of claim 5, wherein the access control property of the ancestor object also identifies an object class, and the propagating step includes giving the trustee object the identified access right for a target object property of the identified property type only if the target object belongs to the identified object class.

7. The method of claim 5, wherein the property type identified in the access control property of the ancestor object indicates a specific object property rather than a set of properties, and the propagating step includes giving the trustee object the identified access right for the specific property of the target object.

8. The method of claim 7, wherein the propagating step further comprises giving the trustee object the identified access right for the specific property of a descendant of the target object.

9. A hierarchical database access control system comprising:

a computer system having a storage medium and a processor;

a hierarchical database stored in the storage medium and susceptible to processing with the processor, the database including a target object and also including an ancestor object which is a hierarchical ancestor of the target object, the ancestor object having an access control property which designates an inheritable access constraint; and means for propagating the inheritable access constraint by applying it to at least the target object.

10. The system of claim 9, wherein the inheritable access constraint includes an object class filter.

11. The system of claim 9, wherein the inheritable access constraint includes an access constraint on a specific object property.

12. The system of claim 9, wherein the inheritable access constraint includes an "inheritable" flag.

13. The system of claim 9, wherein the means for propagating comprises an inherited rights filter for masking access rights.

14. The system of claim 9, wherein the access control property of the ancestor object: (a) identifies a trustee object which receives access rights, (b) identifies a property type indicating the property or properties for which those access rights are given, and (c) identifies at least one access right that is given to the trustee object for properties of that property type.

15. The system of claim 14, wherein the access control property of the ancestor object also identifies an object class, and the means for propagating includes means for giving the trustee object the identified access right for a target object property of the identified property type only if the target object belongs to the identified object class.

16. The system of claim 15, wherein the hierarchical database includes a directory services repository.

17. The system of claim 15, wherein the hierarchical database includes synchronized partitions.

18. The system of claim 14, wherein the property type identified in the access control property of the ancestor object indicates a specific object property rather than a set of properties, and the means for propagating includes giving the trustee object the identified access right for the specific property of the target object.

19. The system of claim 18, wherein the hierarchical database includes a directory services repository.

20. The system of claim 18, wherein the hierarchical database includes synchronized partitions.

21. A computer storage medium having a configuration that represents data and instructions which will cause at least a portion of a computer system to perform method steps for controlling access to objects in a hierarchical database, the method steps comprising the steps of claim 1.

22. The computer storage medium of claim 21, wherein the method steps comprise the steps of claim 6.

23. The computer storage medium of claim 21, wherein the method steps comprise the steps of claim 7.

24. The computer storage medium of claim 23, wherein the method steps comprise the steps of claim 8.

* * * * *